US010911522B2

(12) United States Patent
Ren et al.

(10) Patent No.: US 10,911,522 B2
(45) Date of Patent: Feb. 2, 2021

(54) PARALLEL COMPUTING SYSTEM

(71) Applicant: Xi'an Jiaotong University, Xi'an (CN)

(72) Inventors: Pengju Ren, Xi'an (CN); Long Fan, Xi'an (CN); Boran Zhao, Xi'an (CN); Pengchen Zong, Xi'an (CN); Wenzhe Zhao, Xi'an (CN); Fei Chen, Xi'an (CN); Badong Chen, Xi'an (CN); Nanning Zheng, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 16/191,376

(22) Filed: Nov. 14, 2018

(65) Prior Publication Data
US 2020/0120154 A1 Apr. 16, 2020

(30) Foreign Application Priority Data
Oct. 10, 2018 (CN) .......................... 2018 1 1777712

(51) Int. Cl.
*H04L 29/08* (2006.01)
*H04L 12/933* (2013.01)

(52) U.S. Cl.
CPC .......... *H04L 67/10* (2013.01); *H04L 49/1523* (2013.01); *H04L 67/2842* (2013.01)

(58) Field of Classification Search
CPC .. H04L 67/10; H04L 67/2842; H04L 49/1523
See application file for complete search history.

(56) References Cited

U.S. PATENT DOCUMENTS

| 7,836,116 B1* | 11/2010 | Goodnight | G06F 9/3012 |
| | | | 708/404 |
| 2011/0238955 A1* | 9/2011 | Nickolls | G06F 9/30072 |
| | | | 712/220 |
| 2019/0026350 A1* | 1/2019 | Kowalczyk | G06F 16/2282 |

\* cited by examiner

*Primary Examiner* — Kim T Nguyen
(74) *Attorney, Agent, or Firm* — Dragon Sun Law Firm, PC; Jinggao Li, Esq.

(57) ABSTRACT

A parallel computing system is provided, including input ports, a first switching network, a computing array, a second switching network and output ports. The first switching network is receiving input data from the input ports, sequencing the input data according to different computing modes of the computing array and outputting sequenced input data; the computing array is performing parallel computation on the sequenced input data and outputting intermediate data; and the second switching network is sequencing the intermediate data according to different output modes and outputting sequenced intermediate data through the output ports. The present disclosure applies the switching networks to the parallel computing system and performs any required sequencing on the input or output data according to the different computing modes and output modes to complete various arithmetic operations through the computing array after the input data are input into the computing array.

10 Claims, 3 Drawing Sheets

PARALLEL COMPUTING SYSTEM

CROSS-REFERENCE TO RELATED APPLICATION

This application claims priority from CN Application No. 2018111805017, filed Oct. 10, 2018, the content of which is incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates to the field of computing, and more particularly relates to a parallel computing system.

BACKGROUND

With continuous updating of artificial intelligence algorithms, particularly in a hardware implementation process of a neural network algorithm, there are more and more requirements on the way of sending input data and output data. However, data input and output methods of artificial intelligence-related data processing systems are stereotypical at the present, which may not perform any required data sequencing on input or output data in real time during working, so that only a single computing mode may be completed. Therefore, a structure capable of flexibly sequencing the data is very important to a computing system.

SUMMARY

To solve the above-mentioned technical problem, the present disclosure discloses a parallel computing system, including:

input ports, a first switching network, a computing array, a second switching network and output ports, wherein the first switching network is used for: receiving input data from the input ports, sequencing the input data according to different computing modes of the computing array and outputting sequenced input data;

the computing array is used for: performing parallel computation on the sequenced input data according to the different computing modes and outputting intermediate data; and the second switching network is used for: sequencing the intermediate data according to different output modes and outputting sequenced intermediate data through the output ports.

According to the above-mentioned technical solution of the present disclosure, a technical solution providing a method of flexibly sequencing the input data and the output data and fully releasing different computing powers of the system is implemented.

DETAILED DESCRIPTION

To help persons skilled in the art to understand the technical solution disclosed by the present disclosure, technical solutions of all embodiments will be described below in combination with the embodiments and relevant drawings. The described embodiments are part of the embodiments of the present disclosure, not all of the embodiments. Terms such as "first" and "second" adopted in the present disclosure are used to distinguish different objects, but not intended to describe specific orders. In addition, "include", "have" and any of their variations mean covering and non-exclusive inclusion. For example, processes, or methods, or systems, or products, or devices which include a series of steps or units are not limited to listed steps or units, but selectively further include steps or units which are not listed, or selectively further include other steps or units which are inherent to these processes, methods, systems, products, or devices.

The "embodiment" mentioned herein means that specific features, structures or characteristics described in combination with the embodiments may be included in at least one embodiment of the present disclosure. This phrase appearing at any position in the description does not represent the same embodiment, and is not an independent or candidate embodiment mutually exclusive from other embodiments. Persons skilled in the art can understand that the embodiments described herein may be combined with other embodiments.

Figure 1:
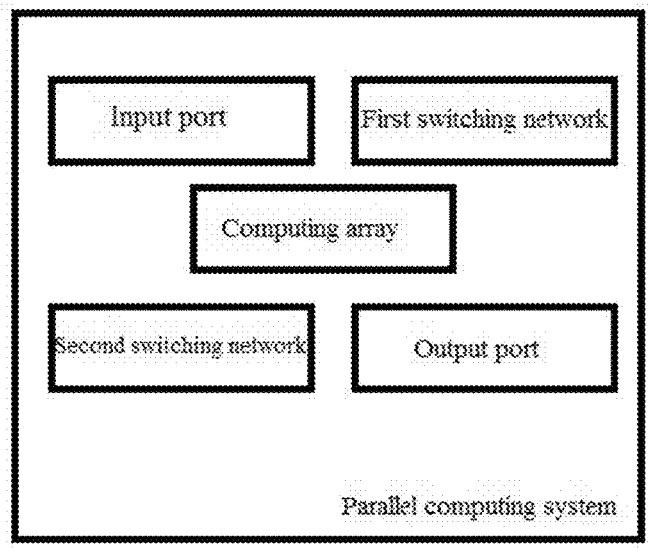
FIG. 1 is a schematic diagram of the structure of a parallel computing system provided in one embodiment of the present disclosure.

Referring to FIG. 1, in one embodiment, the present disclosure discloses a parallel computing system, including:

input ports, a first switching network, a computing array, a second switching network and output ports, wherein the first switching network is used for: receiving input data from the input ports, sequencing the input data according to different computing modes of the computing array and outputting sequenced input data;

the computing array is used for: performing parallel computation on the sequenced input data according to the different computing modes and outputting intermediate data; and the second switching network is used for: sequencing the intermediate data according to different output modes and outputting sequenced intermediate data through the output ports.

This embodiment ingeniously applies the switching networks in a computer system structure to the parallel computing system and performs any required sequencing on the input or output data according to the different computing modes and output modes so as to complete various arithmetic operations through the computing array after the input data are input into the computing array. It can be understood that the above-mentioned technical solution greatly improves the flexibility and the functionality of the system, enriches data transmission methods and simplifies the complexity of various computations such as matrix multiplication and rank conversion, so that the whole system may be configured to complete various types of computations.

Obviously, the above-mentioned embodiment may implement rich computing modes in the field of artificial intelligent, also may be used in the broader field of data computation so as to full release the computing power of the computing array, and even may be used in an interconnecting system in the field of communications so as to improve the concurrency of the system.

As far as the intermediate data is concerned, the intermediate data may be an intermediate result acquired by the computing array, or may be a final result acquired by the computing array. For example:

when a matrix to be processed is relatively large in size, and the computing array may not complete the operation of the whole matrix multiplication, the matrix is required to be partitioned, and at the moment, the intermediate data output by the computing array at each time is the intermediate result. Or, during convolution operation of a convolutional neural network, when the computing array may not compute all input channels at one time, the input channels are grouped, and the computing array completes computation of one group at each time and outputs the intermediate data. At the moment, the intermediate data output by the computing array at each time is the intermediate result.

Similarly, when the matrix is relatively small in size, which implements that the whole matrix may be mapped on the computing array for multiplication operation, the data output by the computing array is the final result. When the input channels of convolution computing is small in size, all the input channels can be mapped on the computing array, the convolution computing is finished and the data output by the computing array is the final result.

In another embodiment, the different computing modes comprise: convolution, matrix multiplication, transposition and other transformations of matrix.

In this embodiment, in different computing modes, the first switching network is utilized to perform various types of sequencing processing on the input data, so as to meet requirements of different computations such as convolution, matrix multiplication, transposition and other transformations of the matrix. It can be understood that the convolution is just a conventional computing mode in the current field of artificial intelligence, but the prior art may be only applied to a certain computing mode instead of being flexibly applied to different computing modes. The present embodiment may achieve the above-mentioned technical effects by ingeniously combining the relevant switching networks with the computing array.

In addition, in another embodiment, different output modes include outputting the sequenced intermediate data in the form of one dimension, or outputting the sequenced intermediate data in the form of multiple dimensions, or outputting the sequenced intermediate data in other forms.

In another embodiment, the first switching network and the second switching network comprise nonblocking networks.

It can be understood that the adopted nonblocking networks are favorable for the instantaneity and the concurrency of the parallel computing system.

Preferably, each nonblocking network includes: a CLOS or BATCHER Banyan or Banyan-based multi-path network, or is a nonblocking network of other architectures.

Ideally, in the prior art and future technology development, any nonblocking network is applicable to the technical solution disclosed by the present disclosure as long as it may implement resequencing of the relevant input data and intermediate data according to different computing modes and output modes. No matter what kind of nonblocking network is adopted, only the structures, the connecting method and the like of its switching units are considered, and the data are sequenced according to different methods.

In another embodiment, for the first switching network or the second switching network, the input data or the intermediate data are sequenced by changing a control word of a switch corresponding to each switching unit in each switching network.

In this embodiment, each switching unit is a basic unit in each switching network, and may be implemented as a switch, such as a digital switch. When the switching unit is implemented as the digital switch, two states, i.e. 0 and 1, included in the digital switch are taken for example. The two working states may be respectively cross state and straight-in state, which may be switched by changing the control word of the switch.

In another embodiment, it can be specifically set as follows: when the control word of an input of the switch is "0", the switch is in the straight-in state, the sequence of the output end and the input end which correspond to the switch is kept consistent. When the control word of the input of the switch is "1", the switch is in the cross state, the sequence of the output end and the input end which correspond to the switch is opposite.

In another embodiment, the input ports and the output ports respectively include input global caches and output global caches.

It can be understood that the global caches are favorable for storage and control of the data.

In another embodiment, the first switching network includes a first BENES network, a second BENES network to a kth BENES network, and the second switching network includes a (k+1)th BENES network; and k is a positive integer.

This embodiment provides a specific embodiment of a relevant switching network. It can be understood that to better facilitate the computation of the system, the input ports are better to be matched with the first switching network. Namely, the number of the input ports is based on that the input ports correspond to the BENES networks in the first switching network one by one. However, other situations of the number of the input ports will be described in the following text, and details are described later.

In another embodiment, if the number of the input data is less than that of the input ports, the redundant input ports are filled with irrelevant data, and the filling irrelevant data are not sequenced through the first switching network.

It can be understood that when the number of the input data is less than that of the input ports, the present embodiment may make full use of the input ports by using the irrelevant data for filling, and also may avoid sequencing the filling irrelevant data, thereby achieving a balance in aspects of making full use of the input ports and sequencing required computing resources.

In another embodiment, if the input data are relatively small in size or relatively low in dimension, the computing array is divided into multiple computing units, and the multiple computing units are used for simultaneously completing computing of multiple groups of the input data;

if the input data are relatively large in size or relatively high in dimension, the input data are divided in a paragraphing or layering or partitioning manner, and the divided input data are computed in batches through the computing array.

Obviously, the objective of the embodiment is to use the computing power of the system to the maximum extent. In addition, it shows that the computing array has configurable capacity, namely the computing array may be divided into multiple computing units as required. It further shows that the input data may be sequenced according to different computing modes and also may be divided as required, such as paragraphing or layering or partitioning, so as to be computed by the computing array in batches on certain occasions.

In another embodiment, the input ports include input global caches from one to k; the input global caches from one to k are respectively used for storing operands from one to k; a bit width of the cached data is acquired by multiplying the number of input data required to be resequenced with the bit width of each digit.

For this embodiment, a general computing method is mostly that k is 2 or 3, namely it is common to use 2 operands or 3 operands, but rare to use multiple operands. A computing scene for 2 operands is generally that: two input caches are respectively used for storing a multiplier and a multiplicand, and the bit width of the cached data is acquired by multiplying the number of input data required to be resequenced with the bit width of each digit. In addition, computation of multiple operands is completely the same as that of 2 operands. For example, if the multiplication computation sample of 2 operands is $a_1 \times a_2 = b$, the multiplication computation sample of multiple operands is $a_1 \times a_2 \times a_3 \times \ldots a_n = b$, wherein $a_1$ to $a_n$ may be a one-dimensional or multi-dimensional array. According to the required computing method, all the data may be distributed to the corresponding computing units in the computing array to acquire a new one-dimensional or multi-dimensional array b after the computation.

In another embodiment, the system further includes a register.

This is favorable for storing the data among all the stages of the switching networks so as to guarantee timing closure, and facilitates formation of a pipeline architecture. By taking such a fact that each switching network adopts the BENES network as an example, although a small number of registers and logic resources are occupied during building of the BENES network, the flexibility and the functionality of the system are greatly improved, the data transmission methods are enriched, and the complexity of various computations such as matrix multiplication and rank conversion is simplified, so that the whole system may be configured to complete various types of computing methods.

In another embodiment, for the BENES networks from the first to the (k+1)th, all stages of switches in each BENES network are connected in two ways; the front half part connected to the input end is built step by step by adopting a reverse perfect shuffle permutation mode; and the rear half part connected to the output end is built step by step by adopting a perfect shuffle permutation mode.

For this embodiment, it can be understood that the BENES network of N×N has $2 \log_2 N - 2$ stages of switches according to the characteristics of the BENES network. All the stages of switches in the BENES network are connected through a pathfinding algorithm. To ensure that the BENES network has a certain recursion characteristic, the front half part, connected to the corresponding input end, in all the stages of switches is built step by step by adopting a reverse perfect shuffle permutation mode; and the rear half part, connected to the output end, in all the stages of switches is built step by step by adopting a perfect shuffle permutation mode.

Wherein, N shall meet the index power of 2 and be greater than or equal to the maximum number of the input data to be resequenced. One switch of 2×2 is built by two one-of-two data selectors.

Wherein, the reverse perfect shuffle permutation mode and the perfect shuffle permutation mode are both connectivity functions, each of which is a mode for interconnecting multiple switching units in the computer system architecture. Perfect shuffle permutation is taken as an example: a binary number of the input end is overall shifted to the left by one digit, so that the original highest digit is shifted to the lowest digit. Such operation is the perfect shuffle permutation. For example: during sequencing of 8 digits, the third digit is taken as an example, and the binary number is 011. After the perfect shuffle permutation is performed, the binary number is 110, which is connected to the input port No. 6 of the next stage of switching unit. During reverse perfect shuffle permutation, the binary number is overall shifted to the right, so that the original lowest digit is shifted to the highest digit.

Figure 2:
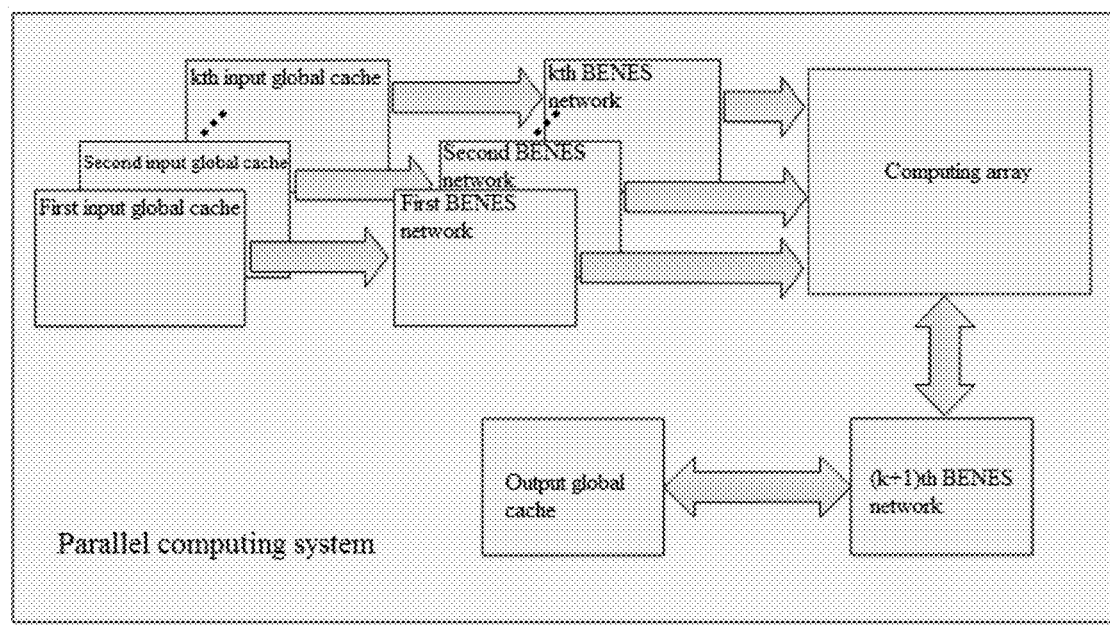
FIG. 2 is a schematic diagram of the structure of a BENES network-based parallel computing system provided in one embodiment of the present disclosure.

In another embodiment, referring to FIG. 2, the number of the input global caches is determined by calculating the number of required input global caches. For example, there are k input global caches, including a first input global cache, a second input global cache to a kth input global cache. There are k+1 BENES networks, including a first BENES network, a second BENES network to a (k+1)th BENES network. The previous k BENES networks are positioned between the k input global caches and the computing array, and the (k+1)th BENES network is positioned between the computing array and the output global cache.

As mentioned above, each switching unit of each BENES network is used as a basic unit, which is a switch of 2×2. The switch has two working states, i.e. a cross state and a straight-in state, which may be switched by changing the control word of the switch.

Figure 3:
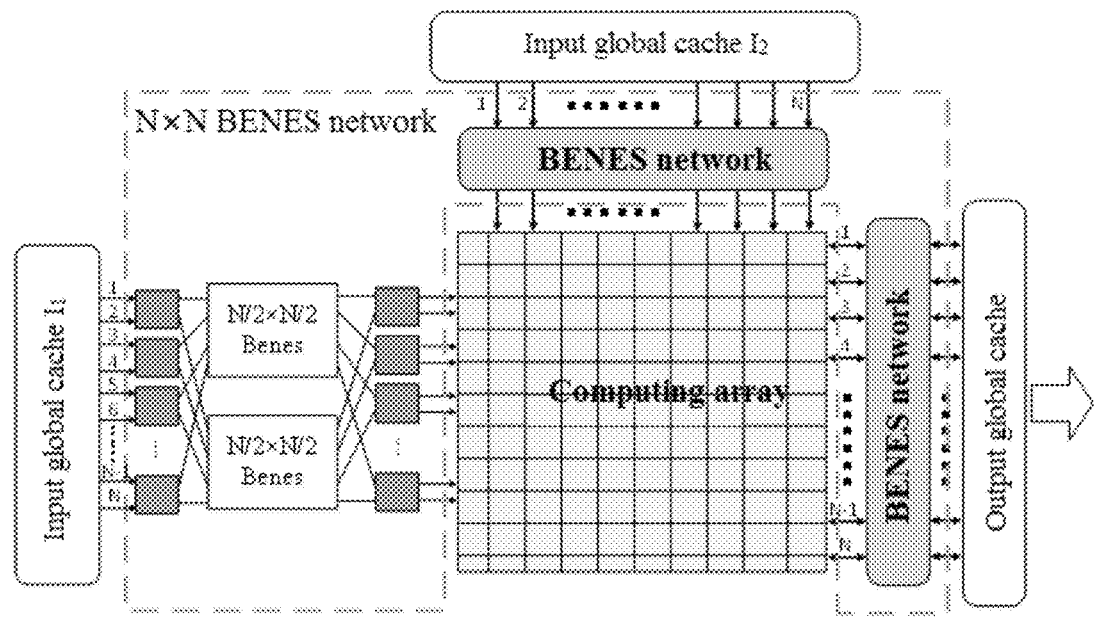
FIG. 3 is a schematic diagram of the structure of a BENES network-based parallel computing system provided in another embodiment of the present disclosure.

In another embodiment, referring to FIG. 3, a BENES network-based parallel computing system is provided, specifically including: two input global caches, three BENES networks of N×N, a computing array and an output global cache. Input data enter the BENES networks from the input global caches. A value of a control signal is generated according to a sequencing requirement of a computing mode for the sequence of the input data. The bit width of the control signal is equal to the number of switches of 2×2 in the BENES network. Each bit correspondingly controls the connecting state of one switch according to the sequence. After the input data pass through the BENES networks, permutation of the input data is completed. The input data are distributed into each computing unit of the computing array according to a point-to-point multiplication method to complete the computation, so that corresponding intermediate data may be acquired. Whether the intermediate data represent an intermediate result or a final result, the intermediate data may enter the BENES network at the output end for resequencing or no changing and be finally stored into the output global cache according to the requirement of an output mode.

As mentioned above, each BENES network has a size of N×N, wherein N shall be an index power of 2. After the size of each BENES network is determined, the number of stages of the network may be acquired: $2 \log_2 N - 1$. Each stage consists of N/2 switches of 2×2. One switch of 2×2 internally consists of two one-of-two data selectors which are controlled by the control word of an input, so as to complete the permutation of the positions of two input data. All the stages of switches in the network are connected through a pathfinding algorithm. The front half part connected to the input end is built step by step by adopting a reverse perfect shuffle permutation mode; and the rear half part connected to the output end is built step by step by adopting a perfect shuffle permutation mode.

Figure 4:
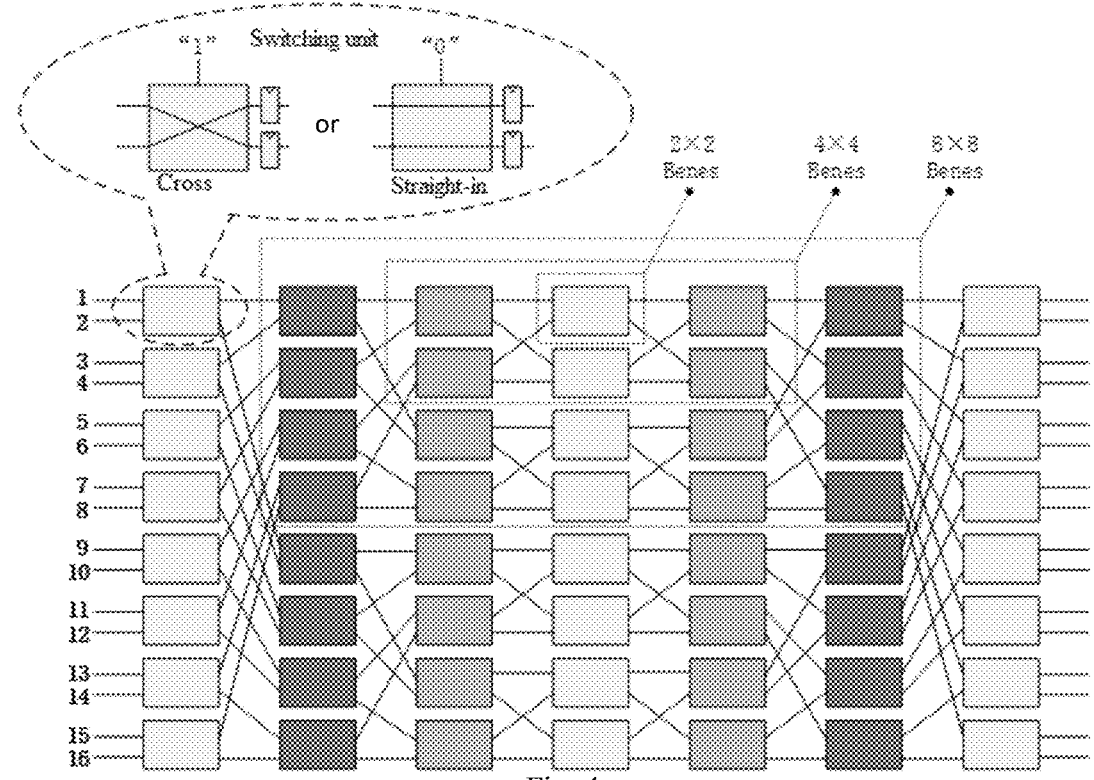
FIG. 4 is a schematic diagram of the structure of a BENES network with the size of 16×16 and the structure of a switching unit thereof in one embodiment of the present disclosure.

Referring to FIG. 4, in another embodiment, a BENES network structure of 16×16 and a switching unit thereof are disclosed. There are 7 stages in the network, and each stage includes 8 switches of 2×2. The previous four stages in the network are connected by adopting a pathfinding algorithm of reverse perfect shuffle permutation, and the later four stages are connected by adopting a pathfinding algorithm of perfect shuffle permutation. One switch of 2×2 has two working modes, i.e. a cross mode and a straight-in mode, according to different control words. A register is plugged into the output end of each switch, which is equivalent to that the data are stored among all the stages of the network so as to guarantee the timing closure during integration, and a pipeline architecture is formed. There are 16 input ports of the network. Therefore, when the size of the matrix operation is less than or equal to 4×4, the data in an input matrix may be subjected to random rank conversion by changing control words of all switching units in the BENES network.

Figure 5:
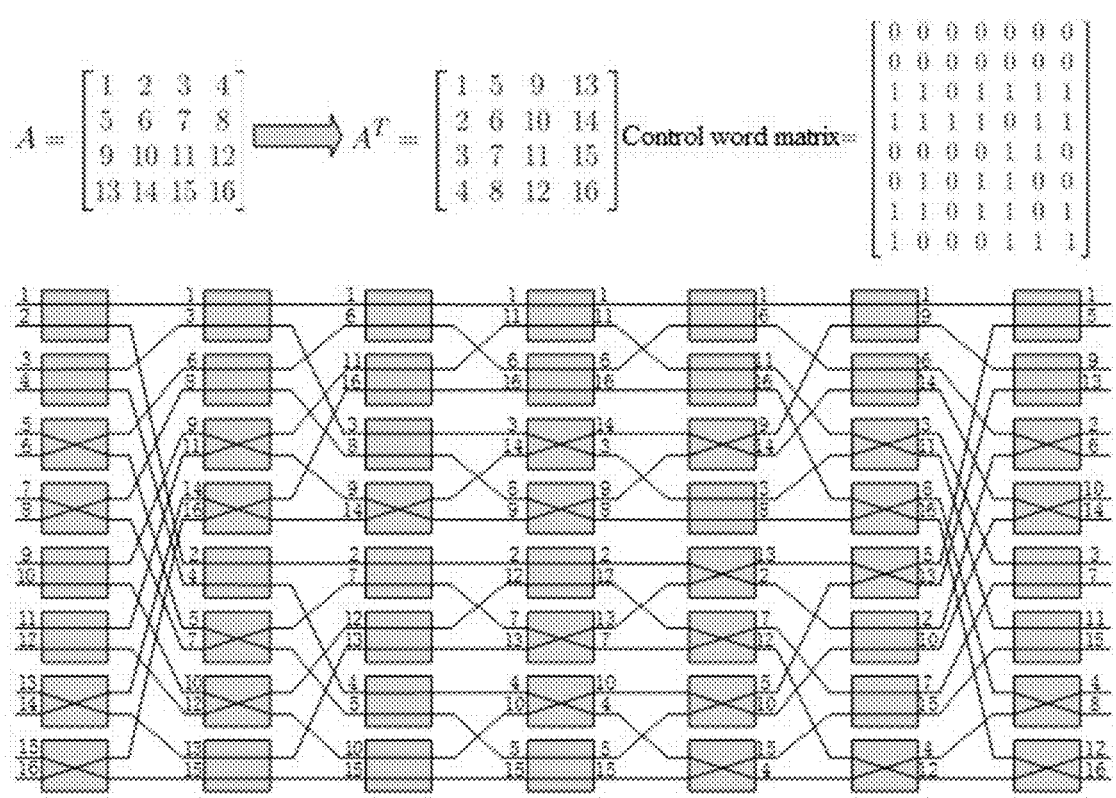
FIG. 5 shows a state and a control word of each stage of switch during transpose permutation of an input by a BENES network with the size of 16×16 in one embodiment of the present disclosure.

Referring to FIG. 5, in another embodiment, transpose permutation performed by a BENES network of 16×16 on a matrix A of 4×4 is disclosed. The BENES network is on one side of an input port, wherein:

It supposes that data are read from one address of an input cache, and respectively correspond to 16 digits in the matrix A from the low bit to the high bit according to an initial fixed permutation mode: 1, 2, 3, 4, 5, 6, 7, 8, 9, 10, 11, 12, 13, 14, 15, 16 as shown in the figure.

The working state of one switch of 2×2 is as follows: when the control word of the input is "0", the switch is in the straight-in state, and when the control word of the input is "1", the switch is in the cross state. In that way, the BENES network of 16×16 totally includes 56 switches of 2×2, so that the bit width of the total control word of the network is 56 bit. Further, all the switches are numbered from left to right and from top to bottom. The control word of each switch corresponds to each bit position of the total control word one to one according to the serial numbers. Therefore, the state of each switch is changed by adjusting the value of the total control word, so that a control word matrix as shown in the figure may be acquired. For the control word matrix, the position of each control word is correspondingly distributed to: the switch at the same position in the BENES network of 16×16.

As shown in FIG. 5, the present embodiment just makes use of the BENES network and a switching mechanism thereof. The present embodiment implements the transposition operation for the matrix A, thus acquiring a transposed matrix $A^T$ of A.

Although the implementation solutions of the present disclosure are described in combination with the drawings, the present disclosure is not limited to the above-mentioned specific implementation solutions and application fields. The above-mentioned specific implementation solutions are merely illustrative and instructive rather than being restrictive. Those of ordinary skill in the art can still make many forms under the inspiration of the description without departing from the scope claimed by claims of the present disclosure, and these forms shall all fall within the protection scope of the present disclosure.

What is claimed is:

1. A parallel computing system, comprising:
input ports, a first switching network, a computing array, a second switching network and output ports, wherein
the first switching network is used for: receiving input data from the input ports, sequencing the input data according to different computing modes of the computing array and outputting the sequenced input data;
the computing array is used for: performing parallel computation on the sequenced input data according to the different computing modes and outputting the intermediate data; and
the second switching network is used for: sequencing the intermediate data according to different output modes and outputting the sequenced intermediate data through the output ports.

2. The system of claim 1, wherein
the different computing modes comprise: convolution, matrix multiplication, transposition and other transformations of matrix.

3. The system of claim 1, wherein the first switching network and the second switching network comprise non-blocking networks.

4. The system of claim 1, wherein
for the first switching network or the second switching network, the input data or the intermediate data are sequenced by changing a control word of a switch corresponding to each switching unit in each switching network.

5. The system of claim 1, wherein
the input ports and the output ports respectively comprise input global caches and output global caches.

6. The system of claim 1, wherein
the first switching network comprises a first Beneficiary Enrollment Notification and Eligibility Simplification (BENES) network, a second BENES network to a kth BENES network, and the second switching network comprises a (k+1)th BENES network, wherein k is a positive integer.

7. The system of claim 6, wherein
the input ports comprise input global caches from one to k; the input global caches from one to k are respectively used for storing operands from one to k; a bit width of a cached data is acquired by multiplying a number of input data required to be resequenced with the bit width of each digit.

8. The system of claim 6, wherein
for the BENES networks from the first to the (k+1)th, all stages of switches in each BENES network are connected in two ways; a front half part connected to an input end is built step by step by adopting a reverse perfect shuffle permutation mode; and a rear half part connected to an output end is built step by step by adopting a perfect shuffle permutation mode.

9. The system of claim 1, wherein
if the input data are relatively small in size or relatively low in dimension, the computing array is divided into multiple computing units, and the multiple computing units are used for simultaneously completing computation of multiple groups of the input data;
if the input data are relatively large in size or relatively high in dimension, the input data are divided in a paragraphing or layering or partitioning manner, and the divided input data are computed in batches through the computing array.

10. The system of claim 1, wherein
if a number of the input data is less than that of the input ports, a redundant input ports are filled with irrelevant data, and the filling irrelevant data are not sequenced through the first switching network.

\* \* \* \* \*